United States Patent [19]

Burgess

[11] Patent Number: 5,060,527
[45] Date of Patent: Oct. 29, 1991

[54] TACTILE SENSING TRANSDUCER

[76] Inventor: Lester E. Burgess, Box AB, Swarthmore, Pa. 19081

[21] Appl. No.: 480,103

[22] Filed: Feb. 14, 1990

[51] Int. Cl.⁵ .......................... G01L 1/18; G01L 5/00
[52] U.S. Cl. ............................ 73/862.68; 73/862.04; 73/865.7; 338/47
[58] Field of Search ............ 73/865.7, 862.04, 862.68, 73/DIG. 4; 338/5, 47

[56] References Cited

U.S. PATENT DOCUMENTS

| | | | |
|---|---|---|---|
| 4,014,217 | 3/1977 | Lagasse et al. | 73/865.7 |
| 4,143,367 | 3/1979 | Schestag | 338/99 X |
| 4,208,648 | 6/1980 | Naumann | 338/99 |
| 4,257,305 | 3/1981 | Friend et al. | 338/114 X |
| 4,319,078 | 3/1982 | Yokoo et al. | 178/18 |
| 4,529,959 | 7/1985 | Ito et al. | 338/295 |
| 4,555,953 | 12/1985 | Dario et al. | 73/865.7 X |
| 4,555,954 | 12/1985 | Kim | 73/862.04 |
| 4,570,149 | 2/1986 | Thornburg et al. | 338/114 |
| 4,640,137 | 2/1987 | Trull et al. | 73/862.04 |
| 4,703,663 | 11/1987 | Oppermann | 73/862.62 |
| 4,715,235 | 12/1987 | Fukui et al. | 73/862.68 |
| 4,734,034 | 3/1988 | maness et al. | 73/865.7 X |
| 4,869,949 | 9/1989 | Muenstedt | 204/242 X |
| 4,964,302 | 10/1990 | Grohn et al. | 73/865.7 |
| 5,010,774 | 4/1991 | Kikuo et al. | 73/865.7 X |

FOREIGN PATENT DOCUMENTS 163945 7/1987 Japan .................................... 73/865.7
184431 7/1989 Japan .................................... 73/865.7

OTHER PUBLICATIONS

"Conductive Fillers Yield EMI Shielding Gains", Modern Plastics, Oct. 1984, p. 62.
"Screen Printed Resistor Senses Force", Machine Design, Jan. 8, 1987, p. 58.
"A Black Splotch", High-Tech Marketing, Mar. 1986, p. 9.

Primary Examiner—Tom Noland
Attorney, Agent, or Firm—Dilworth & Barrese

[57] ABSTRACT

A tactile sensor for providing information as to the distribution and magnitude of tactile force applied to its surface, having a compression sensitive layer of conductive elastomeric cellular material in conjunction with an elastomeric cover layer and a base layer having one or more electrodes in conductive contact with the cellular material. The elastomeric cover layer has a conductive bottom surface in contact with the compression sensitive layer. The circuit path between the outer layers is such that the conductivity varies in response to deformation caused by tactile pressure applied thereto.

36 Claims, 3 Drawing Sheets

TACTILE SENSING TRANSDUCER

BACKGROUND OF THE INVENTION

1. Field Of The Invention

This invention relates to a nonvision sensor, and more particularly, to a tactile sensing transducer for converting tactile pressure into an electrical signal.

2. Background Of the Art

Tactile sensing involves the continuous, variable measuring of tactile force or pressure. In some respects tactile sensing for electromechanical devices is analogous to the human sense of touch in that information about the amount and distribution of tactile pressure over a surface can be received and transmitted. Not surprisingly, tactile sensing finds great utility in the field of robotics where the tactile sensors provide signals for negative feedback control of servomechanisms and the like. Tactile sensing can provide information about shape, texture, position, orientation, deformation, center of mass, and presence of torque or slippage with respect to an object in contact with the sensor. Other applications of tactile sensing will come to mind to those skilled in the art.

One of the methods employed in tactile sensing is the use of a medium whose electrical properties vary in response to pressure induced deformation. For example, some materials exhibit a piezoresistive effect, i.e. the electrical resistance of the material varies in response to deformation. Layers of such material sandwiched between two conductive plates will provide a means for detecting pressure when an electrical potential is established between the two plates, the current flowing between them will vary according to the deformation of the intermediate layer resulting from an external pressure forcing the plates closer together. The current will change according to Ohm's Law:

$$I = \frac{VA}{rL} = \frac{V}{R}$$

where
- I = electrical current
- V = Voltage
- A = Area of conductive plates
- r = specific resistance, i.e. resistivity
- L = distance between plates
- R = Resistance; R = rL/A Measuring the current can provide a means for measuring the tactile force applied to the plates.

The gauge factor of a resistive layer is a measure of the fractional change in resistance (R) divided by the fractional change in distance (L) and indicates the sensitivity of the resistive layer with respect to tactile pressure. Some materials used for the conductive intermediate layer also change in resistivity (r) in response to applied pressure.

Compression sensitive materials currently in use include, inter alia, foamed polymers which contain conductive fillers such as finely divided particles of metal or carbon. Polyurethane, and silicone are also commonly used.

One disadvantage of polymer systems in which the prefoamed polymer is mixed with conductive fillers and then blown to become a foam, is that such polymers lose conductive capability because the direction of the morphological expansion pulls the conductive particles apart.

The tactile sensor, or tactile sensing transducers can be configured with an array of electrodes to provide a measure of the distribution of tactile pressure over a surface. Ideally, the tactile sensor will have sufficient sensitivity, consistent reproducibility, and high resolution. In accordance with the present invention it is now possible to achieve these objects in an improved manner while avoiding the disadvantages of known systems.

SUMMARY OF THE INVENTION

A tactile sensor which defines an electrical circuit path having an electrical resistance which varies in dependance upon the tactile pressure applied is provided herein. The tactile sensor comprises a first layer including at least one electrode; a second layer of electrically conductive cellular foam material which is deformable in response to tactile pressure applied thereto and which has an electrical resistance which varies in dependance upon the deformation, a portion of a first of two surfaces of the second layer being in electrically contacting relationship with the electrode(s) of the first layer; and an electrically conductive third layer having elastomeric properties and having a surface portion which is in electrically contacting relationship with the second surface of the second layer at least when tactile pressure is being applied.

The third layer can comprise a continuous sheet of conductive elastomeric material or a plurality of generally elongated members having conductive properties and being positioned in respectively contacting relationship with one another so as to give the third layer elastomeric properties, e.g. a knitted or woven fabric. The third layer may be in electrical contacting relationship with the second layer when tactile pressure is not applied, or it may be spaced apart from the second layer such that electrical contact is made only when tactile pressure is applied.

The tactile sensor preferably has a fourth layer which is a non-conducting elastomeric material and which has a surface for receiving tactile pressure and an opposite surface in contacting relationship with said third layer, and the first layer preferably has a plurality of electrodes in a spaced apart array.

The electrically conductive cellular foam body of the second layer can comprise a first polymeric resin foam body containing a network of interconnected open cells, and an electrically conductive coating medium occupying at least a portion of the surface area of said network of cells throughout the foam body of the first polymer. The first polymeric resin is preferably a polyurethane and the electrically conductive coating medium preferably comprises an elastomeric polyurethane or silicone resin containing at least one electrically conductive additive such as discrete particles of metal or carbon.

Alternatively, the electrically conductive cellular foam body (containing conductive discrete particles of metal or carbon) of the second layer can be an electrically conductive closed cell foam polymer.

Preferably, the first surface portion of the second layer is bonded to the electrode(s) by an electrically conductive adhesive.

The third layer can be formed by coating the second surface of the second layer with a film of fluid which is capable of being cured to form an electrically conductive solid elastomer, e.g. elastomeric polymer systems which contain discrete particles of metal or carbon, and curing the film.

In one embodiment the fourth layer and third layer are combined to form a cover sheet. The cover sheet is formed by coating a non-conductive elastomeric sheet on one side with a fluid capable of being cured to form an electrically conductive solid elastomer, then curing the film to form a cover sheet with an electrically conductive surface and a non-conducting surface, and positioning the cover sheet such that at least a portion of the electrically conductive surface is in contacting relationship with the second surface of said second layer. Preferably, the electrically conductive surface of the cover sheet is bonded to the second surface of the second layer by an electrically conductive adhesive.

The tactile sensor may further comprise means for determining x, and y coordinates locating a position where the tactile pressure is applied, means for determining the magnitude of said pressure, and means for passing an electric current from a discrete electrode in the first layer through the second layer to the electrically conductive elastomeric third layer. Still another means for defining the x, y coordinates is provided by determining the current flow between the electrodes in the base layer.

The electrodes of the first layer can be substantially point-like or they can comprise strips of electrically conductive material or be in the form of plates. One way to construct the tactile sensor is by successively laying down and curing layers of liquid resin. For example, a silk screening process can be used. However, printed circuit fabrication techniques are preferably used to construct the electrode configuration of the first layer.

DETAILED DESCRIPTION OF THE PREFERRED EMBODIMENTS

The terms "insulating", "conducting", "resistance", and their related forms are used herein as referring to the electrical properties of the materials described. "Tactile sensor" and "tactile sensing transducer" are used equivalently herein. The terms "elastomer" and "elastomeric" are used broadly herein to refer to material that can undergo at least 10% deformation elastically. Typically, "elastomeric" materials suitable for the purposes herein include polymeric materials, as well as natural and synthetic rubbers and the like.

An electronic processing unit to serve the operation of a tactile sensor is described in U.S. Pat. No. 4,014,217 to Lagasse et al., herein incorporated by reference.

Figure 1:
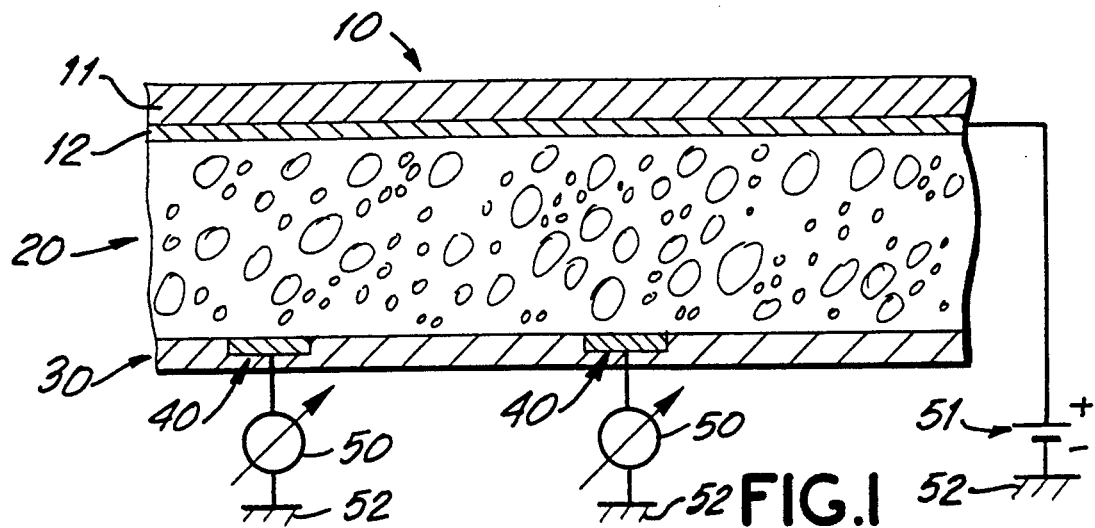
FIG. 1 is a diagrammatic view of the tactile sensing transducer of the present invention with a plurality of electrodes.

FIG. 1 illustrates the tactile sensor of the present invention. Top or cover layer 10 comprises a stretched elastomeric material for covering the tactile sensor and for providing a contact surface for the tactile force to be measured. The elastomeric cover sheet 10 is maintained with a sufficient degree of tautness to eliminate any significant amount of slackness or sagging. By elastically bending and stretching in response to the application of tactile pressure, the cover layer 10 receives and transmits the tactile pressure to the compression sensitive intermediate layer 20 below.

The cover layer 10 includes lower layer 12 which is a conductive elastomer, and preferably also comprises an upper non-conductive layer 11. The upper insulator layer 11 can be polymeric material such as an elastomeric polyurethane or rubber sheet. Conducting layer 12 can be, for example, deposited on the bottom of the elastomeric upper layer 11 so as to form an elastomeric lower conducting surface. The lower layer 12 can also be a polymeric elastomer containing filler material such as finely powdered metal or carbon to render it conducting.

Another alternative is to coat the compression sensitive layer 20 directly with a conductive elastomeric film 12, and then to coat the conductive elastomeric film 12 with a non-conductive elastomeric film 11. Coatings can be applied as liquids which are subsequently cured by polymerization, drying, or other means. It is also envisioned to provide a single elastomeric conductive layer 12 without the insulator layer 11. However, as noted, it is preferable to include the insulating layer 11.

The elastomeric property of the conductive layer 12 is an important feature of the present invention. Because of it, conductive layer 12 can bend and stretch to at least 10% deformation under the application of tactile pressure, and then return to its original configuration when the tactile pressure is removed. This means that the stress and deformation to which the conductive layer 12 will be subjected is well within its elastic limit. The significance of this property with respect to hysteresis and reproducibility will be discussed below.

It should be noted that the elastomeric property of the conductive layer 12 can be associated either with the material itself or with the effective functioning of the configuration of the material. That is, the material itself can be an elastomer, or it can be a material which exhibits elastomer-like properties when arranged in a certain configuration. An embodiment of the present invention is described below wherein a non-elastomeric material can be constructed in the form of knitted or woven fibers into a layer having elastomer-like properties.

As shown in FIG. 1, the conductive surface 12 is connected to an electrical source such as battery 51. Battery 51 creates an electrical potential—or voltage—in conductive surface 12 relative to the ground potential 52. The voltage can range from a minimum required to observe measurable current to a maximum voltage beyond which insulator breakdown or arcing would occur. Generally, a potential of 1–12 volts is preferred.

The lower conductive layer 12 of cover layer 10 is preferably adhered to an intermediate compression sensitive layer 20 by means of a conductive adhesive, such as described below. Alternatively, it may be an electrical contact by pressure touching. Compression sensitive layer 20 is in the form of a conductive material which is deformable in response to the tactile pressure received from cover layer 10, and whose electrical resistance varies in response to the deformation. The compression sensitive layer 20 thereby provides the means for measuring a mechanical displacement and/or force by electrical properties. It also provides a means of determining z coordinate displacement.

As mentioned above certain foamed polymers have been used in the prior art to construct compression sensitive layers. Although such foams have utility in the present invention a preferred alternative is to provide an open celled polyurethane foam in which the network of interconnected open cells is accompanied by a conductive coating of polyurethane or silicone elastomer along the surface of each cell, i.e. a polyurethane or silicone resin coating with conductive additive. The conductive elastomeric polyurethane or silicone coats the surface of the latticework of cells of the polyurethane foam carrier and may even fill the interstices, thereby providing an electrically conductive cellular structure.

Yet another alternative is to provide a conductive elastomeric silicone solid (or elastomeric equivalent filled with metal conductive metal or carbon particles) structure also having a finely divided second filler which can be leached out by an appropriate solvent.

For example, the following method can be used to create a leached sphere silicone cellular structure.

Step 1—Spherically agglomerate a soluble (preferably water soluble) particulate solid with a similarly soluble resin. Preferred materials are powdered sugar and polyvinyl acetate, respectively. Some of the solvent is used in the agglomeration process. The resulting spheres should be rolled in a drum, sieved, and screen classified for size selection.

Step 2—A conductive silicon prepolymer (silicone prepolymer with powdered carbon or metal filler) is mixed with the spheres from step 1.

The conductive silicone filled with the soluble spheres is then polymerized to cure the resin.

Step 3—The polymerized silicone is then immersed in a solvent which will leach out the spheres, e.g. water.

The resulting material is a cellular conductive body which is not expanded.

Figures 2A, 2B:
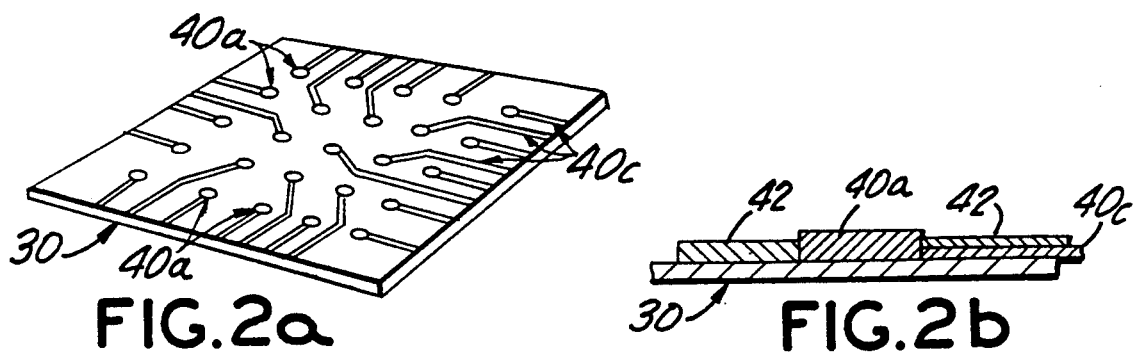
FIG. 2a is a perspective view of one embodiment of the base layer of the present invention with a plurality of point-like electrodes.
FIG. 2b is a cross sectional view showing a layer of non-conductive adhesive or coating to insulate the circuit lines.

The base of the tactile sensor comprises a nonconductive lower layer 30 having a plurality of conductive electrodes 40 in a spaced apart array (e.g. a printed circuit board) as shown in FIG. 2a. The base layer optionally may be an elastomeric film printed with elastomeric electrodes and connecting circuit. Also, it may be formed from one or more layers of liquid resin which is curable by polymerization, drying, etc. to form a polymeric sheet. Electrodes 40 of electrically conductive material such as metal or conductive polymer are electrically connected to an instrument 50 to measure the electric current or electric potential of the electrodes. For optimum resolution it is desirable to fit as many electrodes as possible within a designated area of the tactile sensor. For example, a one square inch tactile sensor can have as many as 125 or more base electrodes.

The electrode pattern may be fabricated by conventional silk screen techniques in which liquid conductive coatings are laid down through a patterned screen and then cured by polymerization, solvent evaporation or other means of solidification. Preferably, the electrode pattern can be fabricated using known printed circuit fabrication techniques. Printed circuit techniques can produce an electrode pattern having a higher resolution than can be achieved with silk screening techniques.

Besides being bonded by a conductive adhesive, the electrodes 40 can rely on pressure to form the electrical contact with compression sensitive layer 20. This can be accomplished by a non-conducting adhesive coating being laid down (e.g. by silk screening) on the non-electrode area of the base layer 30, which is not intended to make electrical contact with the compression sensitive layer 20, while the electrodes remain uncoated. Circuit lines 40c should not be allowed to make electrical contact with the compression sensitive layer 20. For example, referring to FIG. 2b, electrical leads 40c may be coated with a non-conductive coating or adhesive 42 while leaving point-like electrodes 40a uncoated with the non-conducting coating or adhesive 42.

Although tactile pressure alone is sufficient to make the appropriate electrical contacts, it is preferable to bond the electrodes 40 to compression sensitive layer 20 by means of a conductive adhesive. Use of a conductive adhesive to attach conductive layer 12 to compression sensitive layer 20, and to bond the electrodes to layer 20 as well, enables the tactile sensor to achieve high reproducibility of results with little hysteresis. In such case, the resilience of the upper layer 10 is further enhanced by the resilience of the adhesive. The adhesive bonding of the layers enables the layers to move as a unit by preventing movement of the contiguous surfaces of the conductive layer 12 and the compression sensitive layer 20 relative to each other and by enabling the elasticity of the cover layer 12 to urge the top surface of the compression sensitive layer 20 to return to its original configuration after tactile pressure has been applied and removed. A secure electrical contact is achieved. Moreover, differences in the expansion or contraction movements between the cover layer 10 and compression sensitive layer 20 are greatly reduced if the layers are bonded at their contiguous surfaces.

Table 1 below shows a tabulation of the electrical potential of the electrodes 40 with respect to the displacement by compression of the cover layer 10 for a tactile sensor with ¼" thick conductive foam compression sensitive layer 20. Conductive adhesive was not used to bond the layers. After initial use the tactile sensor showed the following results with respect to compression (i.e. increasing the loading) and relief (decreasing the loading).

TABLE 1

| Displacement (Thousandths of inches) | Volts | |
|---|---|---|
| | Compression | Relief |
| 0 | 0 | 0 |
| 1 | 2.5 | 1.3 |
| 2 | 2.5 | 1.8 |
| 3 | 2.5 | 2.4 |
| 4 | 3.5 | 4.4 |
| 5 | 5.0 | 4.8 |
| 6 | 5.0 | 5.0 |
| 7 | 5.0 | 5.0 |
| 8 | 5.4 | 5.1 |
| 9 | 5.4 | 5.2 |
| 10 | 5.5 | 5.4 |
| 11 | 5.5 | 5.5 |
| 12 | 5.9 | 5.9 |
| 13 | 5.9 | 5.9 |

TABLE 1-continued

| Displacement | Volts | |
|---|---|---|
| (Thousandths of inches) | Compression | Relief |
| 14 | 6.0 | 6.0 |
| 15 | 6.0 | 6.0 |

An amount of electrical resistance is associated with the electrical contacts between the electrodes 40 and second layer 20, and between the conductive layer 12 and the second layer 20. This resistance can vary as tactile pressure is being initially applied and the conductive layer is being initially displaced. Beyond an initial displacement range, the tactile sensor enters a nominal displacement region of measurement wherein the electrical contacts between the layers have reached minimal resistance and do not change significantly in resistance as the cover layer is being further displaced.

As can be seen from Table 1, beyond the initial three thousandths of an inch displacement region of measurement in which the component layers of the tactile sensor have not yet reached minimal resistance, there is little hysteresis in the nominal deformation zone of conductive foam layer 20, i.e. where the layers are in full electrical contact.

Table 2 is a tabulation of the resistance of the compression sensitive layer 20 with respect to the displacement by compression of the cover layer for a tactile sensor with a ⅜" thick conductive foam 20. Conductive adhesive was used to bond the conductive surface 12 of the cover layer and the individual electrodes 40 to the compression sensitive layer 20. Data is presented for three cycles of compression and relief.

TABLE 2

| Displacement | Resistance (Ohms) C = Compression R = Relief | | | | | |
|---|---|---|---|---|---|---|
| | Cycle 1 | | Cycle 2 | | Cycle 3 | |
| (thousandths of inches) | C | R | C | R | C | R |
| 0 | 20 | 20 | 20 | 20 | 20 | 20 |
| 7 | 16 | 16 | 16 | 16 | 16 | 16 |
| 14 | 13.5 | 13 | 13 | 13 | 13 | 13 |
| 34 | 12 | — | 10 | 12 | 10 | 11 |
| 54 | 7 | 7 | 7 | 7 | 7 | 7 |
| 64 | 6 | 5 | 5 | 5 | 5 | 5 |

Table 2 illustrates the reproducibility of resistance readings and very low hysteresis achievable by the tactile sensor of the present invention when using conductive adhesive to secure the layers.

A suitable conductive adhesive may be formulated by mixing 70 parts by weight (pbw) of polyvinyl chloride, 30 pbw Shawinigan Black (TM) carbon pigment or an equivalent carbon black or carbon pigment, and 600 pbw tetrahydrofuran solvent or diluent. Nickel or silver particles may be used to replace part or all of the carbon particles. The amount of Shawinigan Black may be varied to achieve different resistance values. Alternatively DOW Silastic 732TM may be used.

The tactile sensor of the present invention can provide x, y, and z intelligence about the tactile force applied to its surface. Many prior art sensors provide only x, y intelligence, i.e. information as to x, y coordinates of the force, or where on the surface of the sensor the force is being applied. The tactile sensor of the present invention also can provide z coordinate intelligence, i.e. information as to the magnitude of the displacement and/or force.

Figure 3:
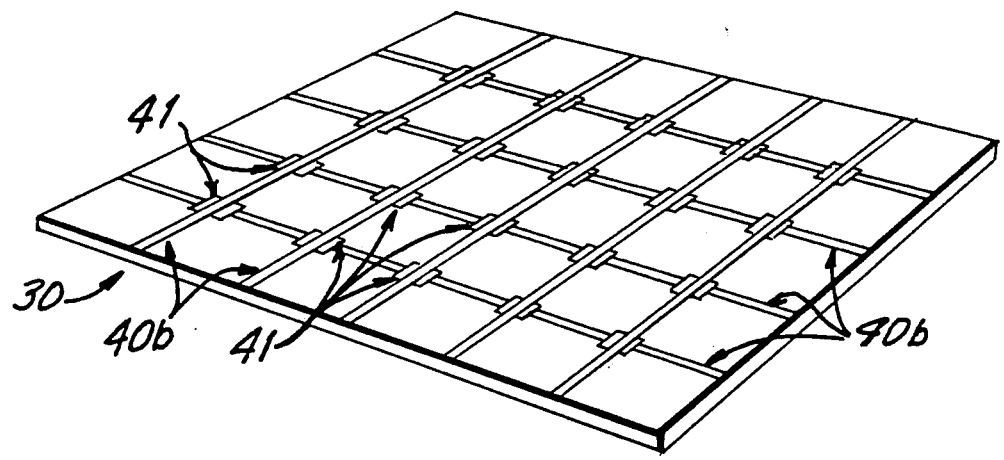
FIG. 3 is a perspective view of an alternative embodiment of the base layer of the present invention with electrode strips.
Figure 4:
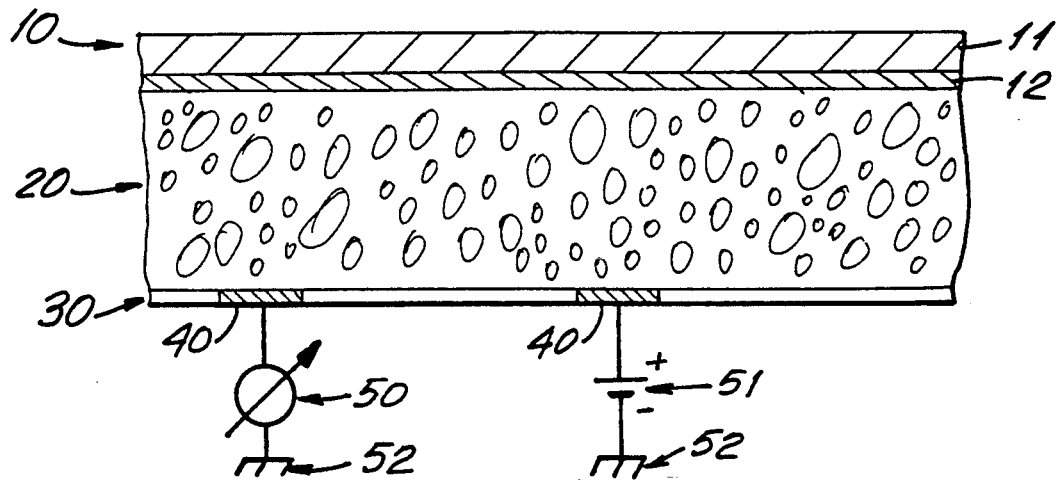
FIG. 4 is a diagrammatic cross-sectional view of an alternative configuration of the present invention.

Alternative embodiments of the tactile sensor base are illustrated in FIGS. 3 and 4, showing respectively discrete point-like phase electrodes 40a, and electrode strips 40b. When crossed over strips are employed, non-conducting strip dividers 41 are required to prevent electrical contact between electrode strips.

An alternative method of operation is illustrated in FIG. 4. Instead of arranging the circuit such that the current flows between the cover layer 10 and the electrode 40, the current can be shunted between electrodes 40 by contacting the electric source to one or more selected electrodes and measuring the current at adjacent electrodes. Compression of the compression sensitive layer 20 in the vicinity of the path of the shunt current will cause a measurable variation in that current. The presence of the upper conductive layer 12 will cause a distinctive configuration of the electric field within the tactile sensor. Some of the shunt current will be carried by the conductive layer 12.

Figure 5:
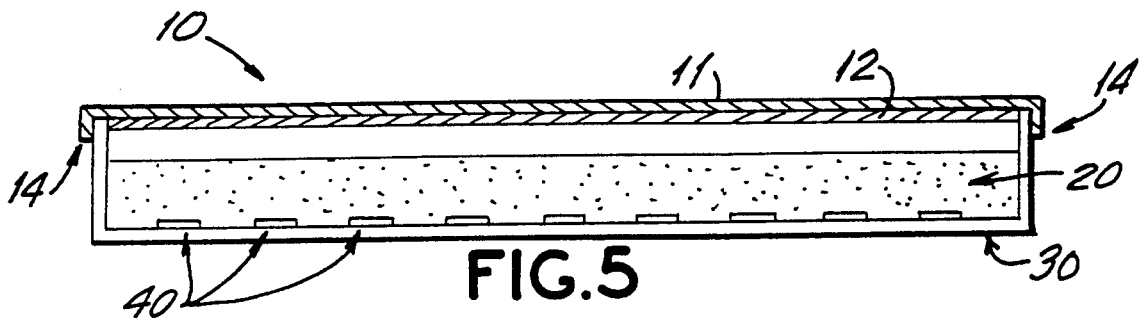
FIG. 5 is a diagrammatic view of an alternative embodiment of the tactile sensor of the present invention.

FIG. 5 illustrates another embodiment of the present invention. Cover sheet 10, which includes the elastomeric insulating sheet 11 and the elastomeric conductor 12, is positioned across the top of a tactile sensor. Preferably, the edges of the cover sheet 10 are fixedly attached to the top of the sidewalls 14. The elastomeric conductor 12 is separated from the compression sensitive layer 20 by a gap 13. Thus, when no tactile pressure is exerted on cover sheet 10, the tactile sensor constitutes an open circuit. No measurable current will pass through the compression sensitive layer even though a voltage difference may be applied between the electrodes 40 and the elastomeric conductive layer 12. When the tactile pressure is applied, current will flow only when the elastomeric conductor is displaced far enough to come into electrical contact with the adjacent top surface of the compression sensitive layer 20 thereby closing the electrical circuit path. With further displacement the amount of current will vary depending on the amount of further displacement. The advantage of this type of sensor is that a voltage can be continuously applied to the sensor without drawing any current until the sensor is activated or "turned on" by a minimum tactile force. The sensor will then return to the "off" or open circuit condition when the tactile force is removed.

This type of tactile sensor is preferably constructed using the elastomeric conductor of the present invention rather than the prior art conductors such as metal foil or films, which are not elastomeric. If a conductor is not elastomeric it will not be able to stretch to the degree required for the repeated operation of this type of sensor without either cracking, splitting, or deforming permanently beyond its elastic limit such that it will not return to its original configuration.

Figure 6:
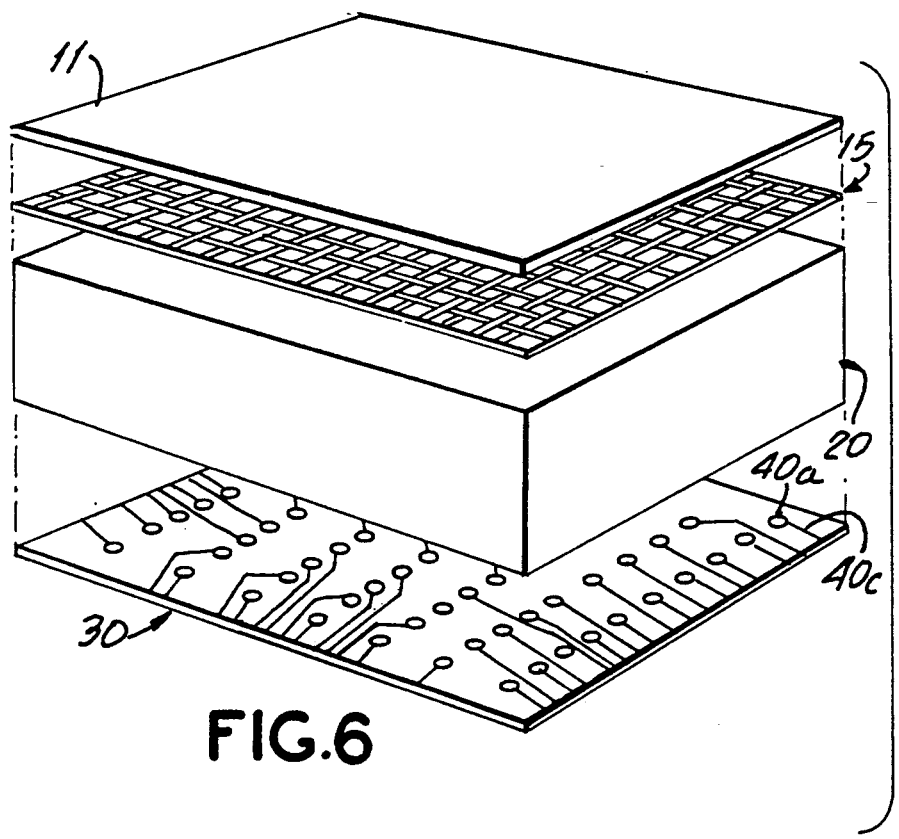
FIG. 6 is an exploded perspective view showing an alternative embodiment of the present invention.

Yet another embodiment of the present invention is shown in FIG. 6. In this embodiment the conductive layer 15 is in the form of a knitted or woven fiber network, i.e. the electrically conducting third layer comprises a plurality of generally elongated members positioned in respective contacting relation with each other. The advantage to this embodiment is that the fiber can be constructed from a material which is not an elastomer per se. For example a nylon fiber can be knitted or woven into a mesh and the mesh can be coated with a metallic conductor by, for example, electroless deposition. Although neither the nylon fiber nor the metal coating is per se an elastomer, nevertheless the network itself will perform like an elastomer in that it can undergo more than 10% deformation under tactile pressure and return to its initial configuration once the pressure has been removed. The interconnected loops of the knitted or woven mesh act like a network of springs. In an elastomeric material such as rubber the "springs" are the molecular chains.

Figure 7:
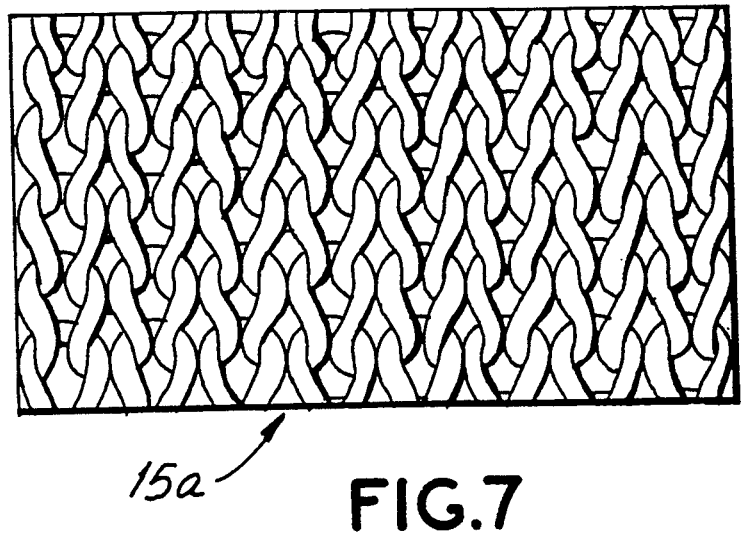
FIG. 7 illustrates a knitted form of the conductive layer of the present invention.
Figure 8:
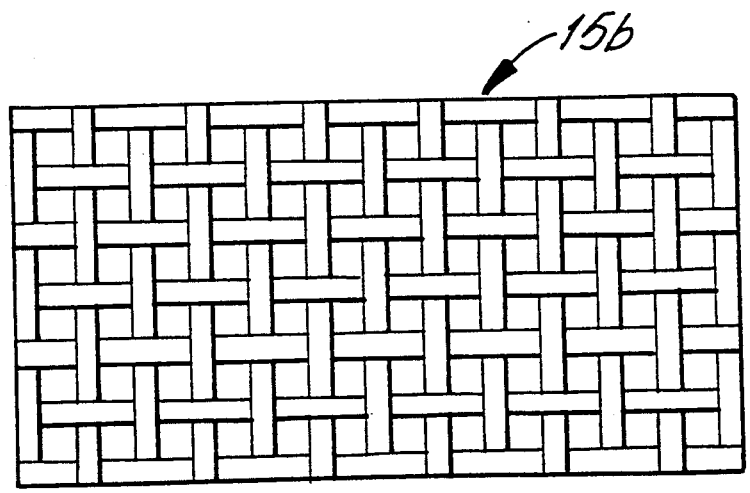
FIG. 8 illustrates a woven form of the conductive layer of the present invention.

Network patterns which can be utilized in the conductive mesh 15 include for example, the knitted network 15a illustrated in FIG. 7, and the woven network 15b illustrated in FIG. 8. Of these, the knitted network is preferred.

While the above description contains many specific features, these specific details should not be construed as limitations on the scope of the invention, but merely as examples of preferred embodiments thereof. Those skilled in the art will envision many other possible variations that are within the scope and spirit of the invention as defined by the claims appended hereto.

What is claimed is:

1. A tactile sensor which defines an electrical circuit path having an electrical resistance which varies in dependance upon the tactile pressure applied, which comprises:
  a) a first layer including at least one electrode;
  b) a second layer of electrically conductive cellular foam material which is deformable in response to tactile pressure applied thereto and which has an electrical resistance which varies in dependance upon said deformation, a portion or a first of two surfaces of said second layer being in electrically contacting relationship with said at least one electrode of said first layer; and
  c) an electrically conductive third layer having elastomeric properties and having a surface portion which is in electrically contacting relationship with the second surface of said second layer at least when tactile pressure is being applied.

2. The tactile sensor of claim 1 wherein said third layer is in electrically conducting relationship with said second surface of said second layer only when tactile pressure is applied.

3. The tactile sensor of claim 1 wherein said third layer is in electrically contacting relationship with said second surface of said second layer when tactile pressure is not being applied.

4. The tactile sensor of claim 1 wherein said electrically conductive third layer comprises a continuous sheet of electrically conductive elastomeric material.

5. The tactile sensor of claim 1 wherein said electrically conducting third layer comprises a plurality of generally elongated members having electrically conductive properties and being positioned in respectively contacting relationship with each other, said elongated members being configured so as to give said third layer elastomeric properties.

6. The tactile sensor of claim 5 wherein said plurality of generally elongated members is comprised in a knitted fabric.

7. The tactile sensor of claim 5 wherein said plurality of generally elongated members is comprised in a woven fabric 8. The tactile sensor of claim 5 wherein said elongated members have been coated with a conductive material.

9. The tactile sensor of claim 5 wherein said elongated meters comprise nylon fibers.

10. The tactile sensor of claim 1 further comprising a fourth layer which is a non-conducting elastomeric material and which has a surface for receiving tactile pressure and an opposite surface in contacting relationship with said third layer.

11. The tactile sensor of claim 10 wherein said fourth layer and third layer are combined to form a cover sheet, said cover sheet being formed by coating a non-conducting elastomeric sheet on one side with a fluid capable of being cured to form an electrically conductive solid elastomer, curing said film to form an electrically conductive surface and a non-conductive surface and positioning said cover sheet such that at least a portion of said electrically conductive surface is in contacting relationship with said second surface of said second layer.

12. The tactile sensor of claim 11 wherein said electrically conductive surface of the cover sheet is bonded to said second surface of said second layer by an electrically conductive adhesive.

13. The tactile sensor of claim 10, further comprising a patterned array of electrodes, wherein said first layer, patterned array of electrodes, third layer, and fourth layer are formed by laying down and curing layers of liquid resin.

14. The tactile sensor of claim 1 wherein said at least one electrode of said first layer comprises a plurality of electrodes in a spaced apart array.

15. The tactile sensor of claim 14 further comprising means for determining x, and y coordinates locating a position where the tactile pressure is applied, and means for determining the magnitude of said pressure.

16. The tactile sensor of claim 14 further comprising means for passing an electric current between said electrodes in the first layer and said electrically conductive elastomeric third layer.

17. The tactile sensor of claim 14 wherein the electrodes of the first layer are substantially point-like with circuit lines electrically insulated from said second layer.

18. The tactile sensor of claim 14 wherein the electrodes of said first layer comprise strips of electrically conductive material.

19. The tactile sensor of claim 14 wherein the spaced apart array of electrodes is formed by printed circuit fabrication techniques in which a patterned layer of electrodes and circuit lines is formed on one side of said first layer.

20. The tactile sensor of claim 14 wherein the spaced apart array of electrodes is formed by a silk screen process in which a patterned layer of conductive polymer is formed on one surface of said first layer.

21. The tactile sensor of claim 1 wherein said electrically conductive cellular foam material of said second layer comprises a first polymeric resin foam body containing a network of interconnected open cells, and an electrically conductive medium occupying at least a portion of the surface area of said network of cells throughout the foam body of said first polymeric resin.

22. The tactile sensor of claim 21 wherein said first polymeric resin comprises a polyurethane.

23. The tactile sensor of claim 21 wherein said electrically conductive medium comprises a silicone resin containing at least one electrically conductive additive.

24. The tactile sensor of claim 23 wherein said electrically conductive additive comprises discrete particles of electrically conductive material.

25. The tactile sensor of claim 24 wherein said electrically conductive material is selected from the group consisting of particles of metal, and particles of carbon.

26. The tactile sensor of claim 1 wherein said electrically conductive cellular foam material of said second layer comprises an electrically conductive closed cell polymer.

27. The tactile sensor of claim 1 wherein said at least one electrode of the first layer is physically contacted by said first surface portion of said second layer in response to the application of pressure.

28. The tactile sensor of claim 1 wherein said first surface portion of said second layer is bonded to said at least one electrode by an electrically conductive adhesive.

29. The tactile sensor of claim 1 wherein said third layer is formed by coating said second surface of said second layer with a film of fluid which is capable of being cured to form an electrically conductive solid elastomer, and curing said film.

30. The tactile sensor of claim 1 wherein said cellular foam of the second layer is formed by mixing a liquid resin with predetermined quantities of a conductive particulate filler material and leachable particles, curing said resin to form a solid mass, and then leaching out said leachable particles to form a cellular body.

31. The tactile sensor of claim 30 wherein said resin comprises a silicone.

32. The tactile sensor of claim 31 wherein said leachable particles comprise water soluble particles.

33. The tactile sensor of claim 32 wherein said water soluble particles comprise particles of sugar which have been agglomerated with a water soluble resin and classified according to size.

34. A tactile sensor which defines an electrical circuit path having an electrical resistance which varies in dependance upon the tactile pressure applied, which comprises:
   a) a first layer including at least two electrodes in spaced relation;
   b) a second layer of electrically conductive material which is deformable in response to tactile pressure applied thereto and which has an electrical resistance which varies in dependance upon said deformation, a portion of a first of two surfaces of said second layer being in electrically contacting relationship with said electrodes of said first layer; and
   c) a third layer of electrically conductive elastomeric material, said third layer being positioned with a surface portion in electrically contacting relationship with the second surface of said second layer.

35. A tactile sensor which defines an electrical circuit path having an electrical resistance which varies in dependence upon the tactical pressure applied, which comprises:
   (a) a first layer including a plurality of electrodes positioned in spaced relation;
   (b) a second layer of electrically conductive cellular foam material which is deformable in response to tactile pressure applied thereto and which has an electrical resistance which varies in dependance upon said deformation, a first of two surfaces of said second layer being in electrically contacting relationship with said electrodes of said first layer; and
   (c) an elastomeric third cover layer positioned in contacting relation with the second surface of said second layer and having a first inner layer of electrically conductive material in contacting relation with said second surface of said second layer and an outer layer of insulating material in contacting relation with the opposite surface of said first inner layer;
   whereby said second layer forms an electrically conductive path between said first and third layers and the conductivity of said path varies in response to the deformation of said second layer.

36. A tactile sensor comprising a layered body defining an electrical circuit path with electrical conductivity varying in response to tactile pressure, said layered body comprising:
   a) a base layer including a plurality of electrodes in a spaced apart array;
   b) an intermediate layer having an upper surface and a lower surface, said intermediate layer being above said base layer, and said intermediate layer comprising an electrically conductive material which is deformable in response to tactile pressure applied thereto; and
   c) an elastomeric cover layer positioned above said intermediate layer, said cover layer having an elastomeric electrically insulating top surface for receiving tactile pressure and an elastomeric electrically conductive bottom layer;
   wherein said upper surface of said intermediate layer is in contact with the elastomeric conductive bottom layer of said elastomeric cover layer and said lower surface of said intermediate layer is in contact with said electrodes of said base layer, and wherein said intermediate layer of electrically conductive material comprises a cellular foam body forming an electrically conductive path between the upper and lower surfaces thereof, the conductivity of said path varying in response to deformation of said intermediate layer.

* * * * *